Oct. 25, 1938.　　A. D. GASTON　　2,133,983
VALVE
Filed Aug. 26, 1936　　3 Sheets-Sheet 1

INVENTOR.
Audley D. Gaston

Oct. 25, 1938.   A. D. GASTON   2,133,983
VALVE
Filed Aug. 26, 1936   3 Sheets-Sheet 2

INVENTOR.
Audley D. Gaston

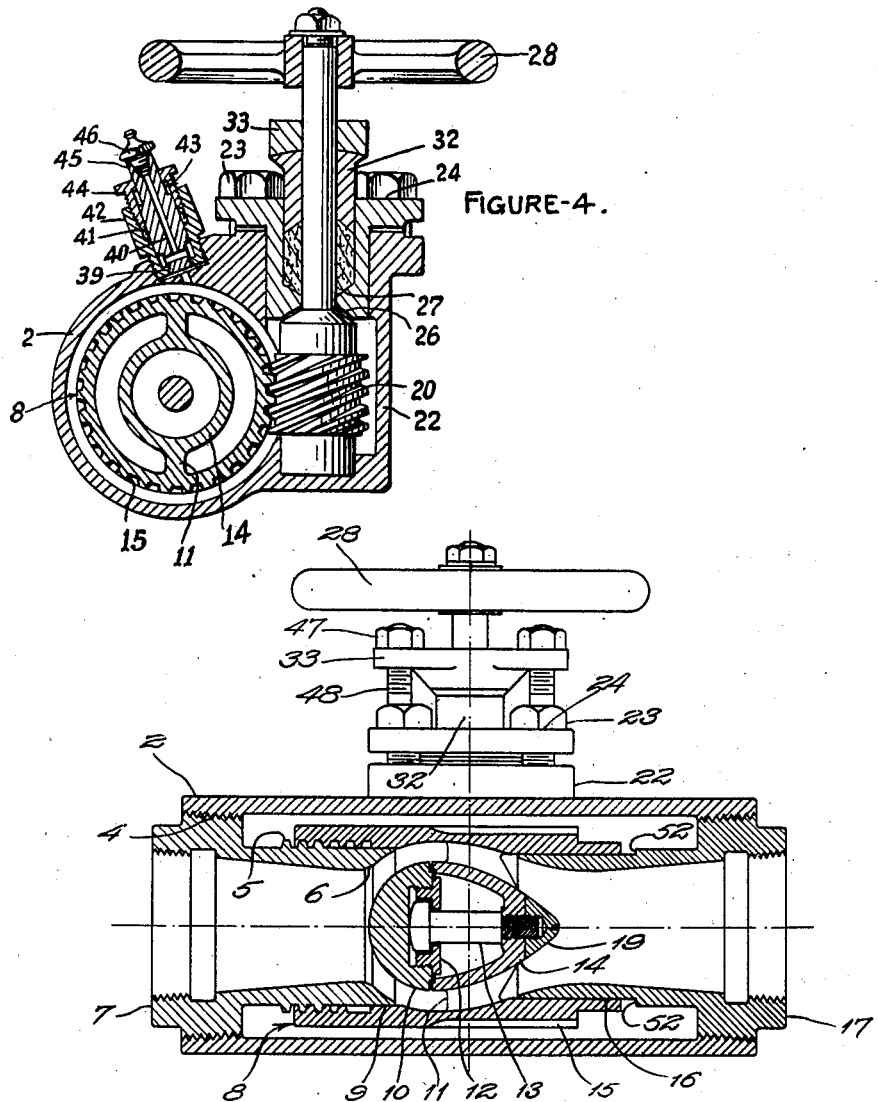

Patented Oct. 25, 1938

2,133,983

UNITED STATES PATENT OFFICE 2,133,983

VALVE

Audley D. Gaston, Baytown, Tex.

Application August 26, 1936, Serial No. 98,051

18 Claims. (Cl. 137—139)

This invention concerns valves for the control of the flow of fluids in piping systems, and is intended to provide a valve for general industrial service, so arranged that the valve may be conveniently and economically lined throughout the fluid passageway with suitable corrosion and, or, erosion resisting metals or alloys, the construction being preferably adapted to permit the introduction of the proper type of lubricant back of the parts comprising the lining to further segregate and protect the body and operating parts from the harmful effects of the fluid being handled, and to accomplish this purpose with the least possible turbulence in the flowing stream and therefore the least possible loss of head, the valve being conveniently arranged for manual operation and control.

Thus, among the ultimate objects of this invention is to provide a valve for general use which shall have a greatly increased life in services handling fluids of a more or less corrosive or chemically active nature, or which may be abrasive due to extremely high velocities or because they carry particles of hard substance or substances tending to cut or erode parts contacted at intermediate velocities, or in services handling fluids which may combine these corrosive and erosive characteristics, and to accomplish the desired increase in life with small hydraulic losses, all of which is brought out more particularly and in detail in the description hereinafter given of several embodiments of the invention illustrated in the accompanying drawings, in which drawings Fig. 1 shows a valve, embodying the features and objects of this invention in sectional elevation, the section being taken along the longitudinal center line of the valve.

Figs. 1 and 2 show a valve having flanged end connections and rising stem.

Fig. 3 is a similar view to Fig. 1 except that it illustrates a valve having screwed ends and non-rising stem.

Fig. 4 is a sectional elevation of the valve shown in Fig. 3, the section being taken normal to the center line of the valve and through the center of the operating mechanism.

The combination of flanged end connections with rising stem and of screwed end connection with non-rising stem were selected for purposes of illustration only, it being understood that either type of end connection may be used with either type of stem.

The corresponding parts in all views of the drawings bear identical reference numbers.

Figure 1:
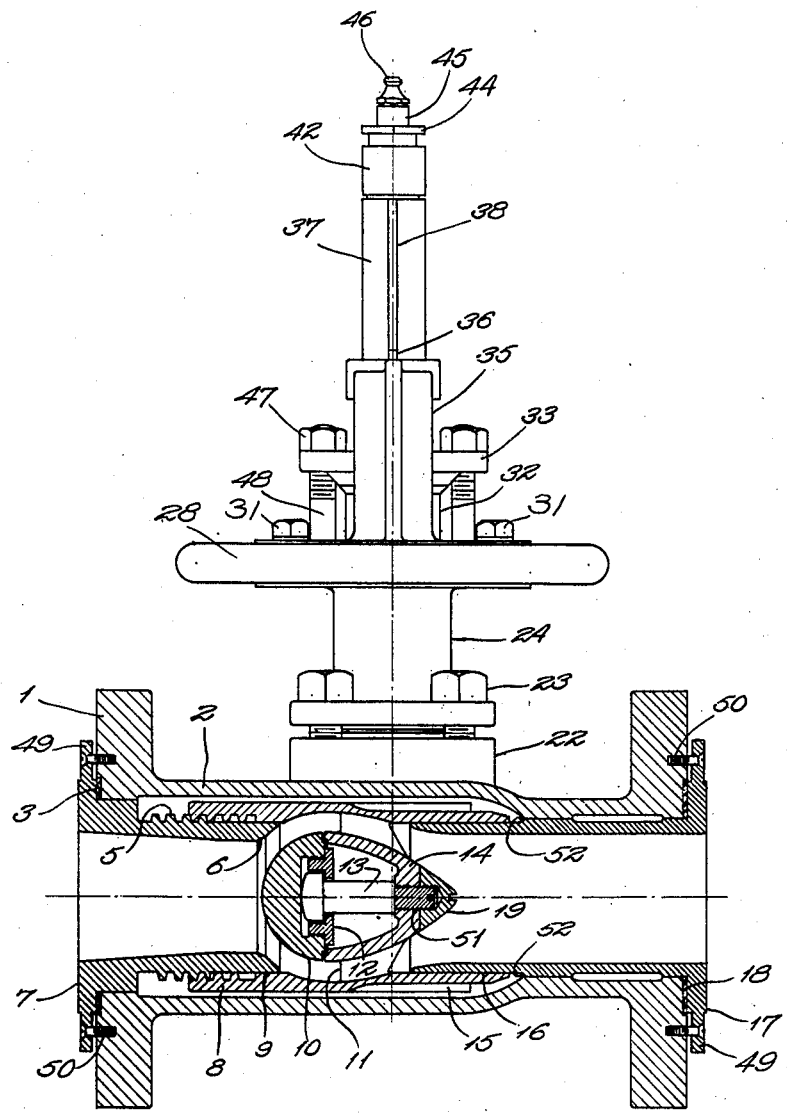

Referring now to the several figures, part 2 is a valve body or housing provided with a boss 22, and flanges 1 or conically tapered threads 4, said body 2 being suitably machined to receive and retain the various component parts. Part 7 is an inlet bushing or tubular member of corrosion and, or, erosion resisting material, provided with a seat 6, threads 5 and bearing 9. Part 17 is an outlet bushing or tubular member, similarly of corrosion and, or, erosion resisting material provided with a bearing 16. Parts 7 and 17, the inlet and outlet bushings respectively will be machined and fitted as shown in Fig. 1 or Fig. 3 depending upon the type of end connection desired. In the flanged design as shown in Fig. 1 parts 7 and 17 are provided with lugs 49 and flat head machine screws 50 to secure them in place in body 2, whereas in the screw end design shown in Fig. 3 parts 7 and 17 are secured and made tight in body 2 by means of conically tapered threads 4. Lugs 49 and flat head machine screws 50 are not necessarily intended to have sufficient strength to compress gaskets 3 and 18 to complete closure of the joint between bushings 7 and 17 and body 2, chief reliance in this respect being placed in the customary companion flanges and bolts by means of which the valve is installed in the piping system. Part 8 is a cage or sleeve, or tubular body, also of suitable corrosion and, or, erosion resisting material, provided with internal ribs 11, which in turn support internal hub 14. Cage 8, ribs 11 and hub 14 may be cast in one integral part or may be separately provided and assembled by welding or other means, but in any event they are preferably of a suitable corrosion and, or erosion resisting material. Part 8 is machined to provide threads 5, meshing with corresponding threads on part 7, helical gear teeth 15, meshing with a companion helix on solid stem 20, and bearing surfaces at 9 and 16 where guiding bearings are respectively provided on inlet bushing 7 and outlet bushing 17. The hub 14 is machined and provided with threads 51 to receive and retain valve bolt 13. Disc 10 is fastened to bolt 13 by means of the retaining nut 12. Bolt 13 is screwed into threads 51 in the hub 14 by means of screw driver slot in its end and locked in position by lock nut 19 which is also provided with screw driver slot. Disc 10, bolt 13, retaining nut 12 and lock nut 19 are also to be of suitable corrosion and, or, erosion resisting material, thus providing a passageway in which all parts that are contacted by the moving fluid are of materials especially suited to give long life in the particular service.

Moreover disc 10, hub 14 and lock nut 19 are so shaped as to provide, when assembled, a contour commonly known as streamlined, which, in combination with the carefully proportioned annular passageway between parts 10, 14 and 19, as assembled, and cage 8, forms a fluid passageway through the valve which causes the least possible turbulence, the least possible deviation of the fluid particles from a straight line, and the least possible velocity changes, thus reducing hydraulic losses to a minimum.

The annular space between cage 8 in combination with inlet bushing 7 and outlet bushing 17, which will be made of suitable corrosion and, or erosion resisting material and which form a protective lining throughout the length of the fluid passageway, and body 2 is advantageously filled with a suitable grease or lubricant not only to facilitate the operation of the valve but also to serve as additional means for protecting body 2 and external operating parts against any harmful effects arising from or owing to the nature of the fluid being handled by the valve and the piping system in which it is used. A suitable grease or lubricant applied to the surface of a metal or alloy and so located that it cannot be readily removed by dissolution or washing away is in itself an excellent protection against corrosion and it is one of the purposes of this invention to provide the annular space above mentioned and suitable means for replenishing the lubricant from time to time, which means will be described in further detail later.

The cage 8 together with its integral parts 11 and 14, and the removable parts 10, 12, 13 and 19, constitute a revolving, endwise movable member under control of the handwheel 28 through valve stem 20 and helical gear thereon. It will be evident upon referring to the several figures, that turning handwheel 28 rotates cage 8 on bearings 9 and 16, by means of helical gear 15 and valve stem companion helix, thus bringing into play screw threads 5 between inlet bushing 7 and cage 8 causing an endwise movement of the valve disc 10 to its seat 6, and conversely an opposite rotation of handwheel 28 reverses the function of the helical gears and screw thread 5, causing valve disc 10 to move away from its seat, thus closing or opening the valve as the operator may desire.

The tangent of the helix angle of thread 5 and the tangent of the helix angle of helical gear 15 may be, and preferably will be, selected to be less than the coefficient of friction of the contacting materials so that when valve is closed with valve disc 10 firmly seated against valve seat 6, cage 8 is doubly locked against any change in position through the locking action of threads 5 and of helical gear 15.

Part 24 is a valve bonnet held in place by cap screws or studs 23 and provided with gasket 21, gland 32, gland packing 27 and gland follower 33. Gland follower 33 is provided with studs 48 and nuts 47 for adjustment or removal for repacking as the case may be.

In Figures 3 and 4, illustrating the non-rising stem design, bonnet 24 is provided with a machined shoulder 26, a companion shoulder being machined on solid stem 20. A counterclockwise rotation of handwheel 28 causes cage 8 to move to the open position, shoulder 52 on outlet bushing 17 being provided as a stop to limit the opening movement to the full open position beyond which no further gain in flow can be expected. Any further counterclockwise rotation of handwheel 28 will lift valve stem 20 until its shoulder contacts shoulder 26 forming an auxiliary seal under packing 27. Since both in the case of screw threads 5 and helical gear 15 the tangent of the helix angle is less than the coefficient of friction valve stem 20 is locked with its shoulder tightly closed against shoulder 26 on bonnet 24 and packing 27 may be safely removed for renewal while the valve is in service and wide open under full pressure. In this design handwheel 28 is mounted on solid valve stem 20 and secured in the usual manner by means of a key, washer and nut.

Figure 2:
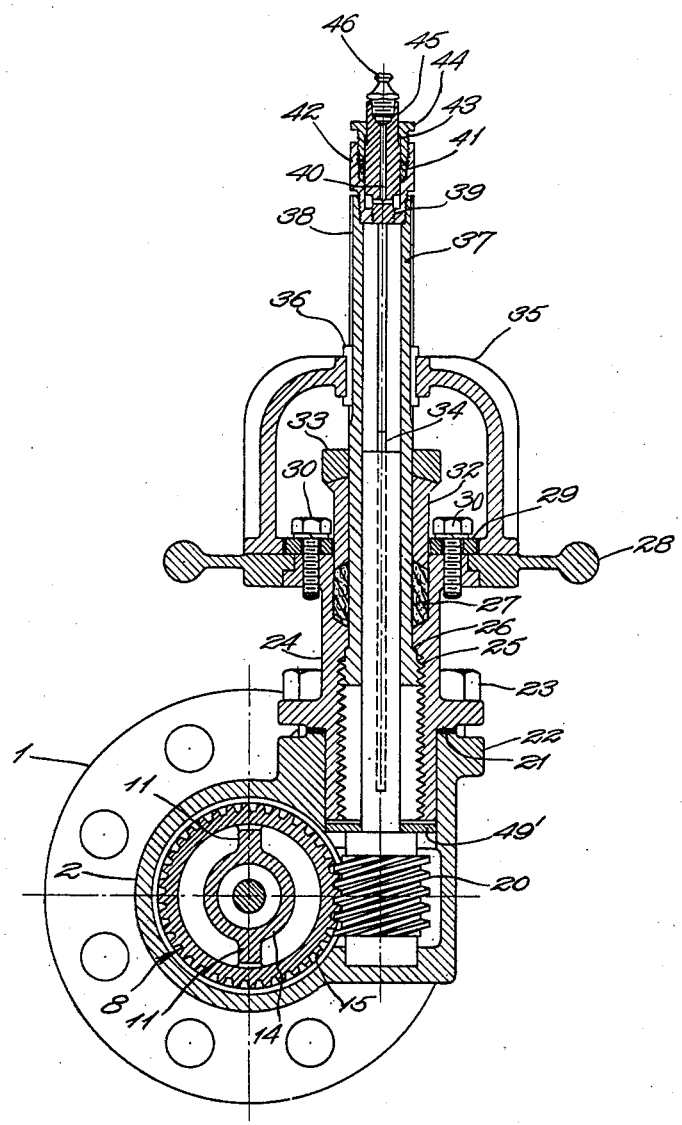
Fig. 2 is a sectional elevation of the same valve as shown in Fig. 1, the section being taken normal to the center line of the valve and through the center of the operating mechanism.

In Figures 1 and 2 illustrating the rising stem design, the valve stem is divided into two parts, solid stem 20 and hollow stem 37, which are keyed together by means of sliding key 34 and keyways provided therefor. Bonnet 24 is provided with internal threads 25 and machined shoulder 26, and the hollow stem 37 is provided with companion threads and shoulder, so that upon clockwise rotation of handwheel 28 the hollow stem 37 moves down and upon counterclockwise rotation moves up, the upward movement being stopped upon contact of the shoulder on the stem with shoulder 26, when the valve is in the wide open position. Contact of shoulder on the stem with shoulder 26 forms an auxiliary seal under packing 27 making it possible to remove gland follower 33 and gland 32 and renew packing 27 with the stem in this position and the valve wide open and under full pressure. Key 34 is a long key arranged to slide in both the keyway in solid stem 20 and hollow stem 37. Key 34 is provided with a hook on its upper end so as to be readily removable through top of hollow stem 37 upon removal of lubricating plug body 42. In assembling the valve, key 34 is temporarily inserted in the keyways and handwheel 28 is rotated counterclockwise until cage 8 contacts shoulder 52. Then the handwheel is rotated clockwise a sufficient amount to back cage 8 away from shoulder 52 approximately one eighth of an inch. Key 34 is then removed and handwheel 28 rotated counterclockwise until shoulder 26 is contacted by the shoulder on hollow stem 37. Key 34 is then permanently inserted at the first angular matching point of keyways in solid stem 20 and hollow stem 37. Thus the opening of the valve is limited by shoulder 26 which forms the auxiliary seal under packing 27 making it possible to repack the gland when the valve is wide open and in service under pressure. Since the tangent of the helix angle of screw threads 25 is less than the coefficient of friction, hollow stem 37 when in this top position is locked with its shoulder in contact against shoulder 26 on bonnet 24, and yoke 35 may safely be removed if desired to facilitate the removal of gland parts 32 and 33 for renewing packing 27. Part 49' is an end thrust washer or bearing limiting the movement of solid stem 20 in an upward direction.

Referring to Figures 1 and 2, a top flange and bearing is provided on bonnet 24 to receive handwheel 28, which is secured by means of handwheel retaining ring 29 and cap screws 30. Yoke 35 is fastened to handwheel 28 by means of cap screws 31 and fitted with feather keys 36 which are engaged in keyways 38 in hollow stem 37. Thus the operation of handwheel 28 in either clockwise or counterclockwise direction causes a corresponding rotation of hollow stem 37 and of solid stem 20, thereby controlling the movement of the valve within the body.

In practice, hollow rising stem 37 may be calibrated and marked along the edges of keyways 38 from zero to one hundred percent in suitable subdivisions thereof, using top of key 36 as an indicator, to show percentage opening of valve disc 10 with respect to valve seat 6. Thus, hollow rising stem 37 becomes an indicator which may be observed from a distance to tell whether the valve is in the closed or open position, and, upon closer inspection, the percentage opening at which the valve is set.

Hollow stem 37 is provided with conically tapered threads in its top to accommodate lubricating plug body 42. This plug body 42 is fitted with lubricating plug 45 which is held in place by means of conically tapered threads 39. Gland 44 is provided with a shoulder 43 which prevents the plug 45 from being totally unscrewed from plug body 42. Lubricating plug 45 is sealed by gland packing 41 and gland 44 and is fitted with a lubricating fitting 46, comprising a ball check (not shown) and a lubricant passageway 40.

Thus, to lubricate the inside working parts of the valve, lubricating plug 45 is partially unscrewed from conically tapered threads 39 and seated against shoulder 43. A lubricating pressure gun is then applied in the usual manner forcing lubricant through tapered threads 39 which are in a partially opened position. Since keyways in solid stem 20 and hollow stem 37 are slightly deeper than necessary to accommodate the key 34, passageway is provided for lubricant from the space below lubricating plug 42 to the space below hollow stem 37. Thrust washer 49' is loosely fitted in boss 22 and around solid stem 20 so that lubricant may pass through to all the space around the helical gears and between inlet bushing 7, outlet bushing 17 and body 2. After replenishing the lubricant as above set forth plug 45 is returned by means of wrench or pliers to a tight fit in tapered threads 39, thus closing the system without placing final reliance on the ball check, which is part of lubricating fitting 46. An important feature of the construction is that gland packing 27 is separated from the corrosive fluid by the lubricant interposed between it and the fluid passageway. Packing 27 is therefore kept lubricated and in an ideal operating condition. Although the lubricating device is shown mounted on the top of the stem, it need not necessarily be at that point but may be screwed into the body as is shown in Fig. 4 or at any other suitable location. It is to be understood that any other suitable means of introducing lubricant may be used in conjunction with this valve.

In Fig. 4 illustrating the non-rising stem design the lubricating device will be screwed directly into body 2, as shown, or in any other convenient location, but functions otherwise in a similar manner to the one described above.

It is to be noted that the cage 8 is supported internally of the housing 2 by the bushings 7 and 17 and that the longitudinal axes of the cage 8, bushings 7 and 17 and the streamlined valve are all in the same straight line, so that upon rotation of the sleeve 8 about its axis the streamlined valve is moved along the same axis by screw threads 5 towards or away from the valve seat 6, said movement being under control of the operator by means of the handwheel 28 and helical gear 15.

Attention is called to the fact that screw threads 5 may be introduced connecting outlet bushing 17 and cage 8, or connecting body 2 and cage 8, without destroying the functional operation of the various parts, the location shown being chosen because expansion strains due to temperature differences are eliminated.

The following are given as examples of the corrosion and, or erosion resisting metals or alloys of which parts 7, 8, 10, 11, 12, 13, 14, 17 and 19 may be made: Monel metal; eighteen eight chrome nickel steel; stainless steel of either the hardenable or non-hardenable variety; acid resisting brass, that is to say brass of the type composition 85% copper, 10% tin and 5% lead; low chrome nickel cast iron; high chrome cast iron; cast hard chemical lead; hard brass or cast iron. For corrosive services where erosion is of consequence the hardenable stainless steels or high chrome cast iron may be used and heat treated for extremely high resistance to abrasion. Although the parts 7, 8, 10, 11, 12, 13, 14, 17 and 19 have been described above as being formed of corrosion or erosion resisting metals, it will be evident from the foregoing description that the invention is not confined to use of the said metals, since it is evident from the foregoing description that the said parts may be formed from any metal or material suitable for use under the conditions under which the device is to be used.

The following services in which metals or alloys of the above type may be expected to greatly prolong the useful life of the valve over what is currently obtained are given as examples: natural gasoline, natural gas and absorber oil, produced or circulated in natural gasoline plants particularly if the field is in a sour crude district; intermediate products in an oil refinery such as untreated naphtha or refined oil distillates, acid sludge, water wash after acid treating, caustic and doctor solution lines and weak acid; mine waters; chemical plant products handling fluids which are destructive to ordinary iron or steel parts; salt water from salt wells; sea water in marine services; sour crudes from oil wells or crudes from wells where salt water and gritty particles of sand are entrained; gas repressuring plants where the gas is not perfectly free from sulphur compounds or hydrogen sulphide.

The metals and alloys given above together with the services mentioned are merely intended to be illustrative since it is obvious that many other metals or alloys or other materials may be selected to meet the needs of a particular service and that there are many other services wherein this invention will advantageously function. It is not the intention to limit the invention to the use of materials, or to the services to which it may be applied, given as examples.

Having described my invention, I claim:

1. A device for controlling the flow of fluids comprising a housing provided with an external boss, the housing having secured therein inlet and outlet bushings, one of said bushings being provided with screw threads to mesh with an internally supported and guided concentrically rotatable and endwise movable cylindrical cage provided with corresponding companion threads and with a valve attached and fixed concentrically therein, said cage being further provided with helical gear teeth cut on the external cylindrical surface thereof, the said bushings and cage providing a lining through the housing throughout the fluid passageway, a helix for the gear teeth on the cage, said helix being fitted within said boss, and a stem attached to said helix for rotating said helix.

2. A device for controlling the flow of fluids comprising a housing, two bushings extending within the body of said housing, one of said bushings serving as an inlet for fluid and the other serving as an outlet for fluid, a tubular body within said housing connecting said two bushings, said two bushings and said tubular body forming a continuous passageway and said tubular body being rotatable about its axis and endwise movable; a valve in said tubular body, spaced from the interior wall thereof, and movable therewith; a seat for said valve in said passageway, and means for rotating said tubular body and for imparting endwise motion thereto operable from the exterior of said housing to move said valve towards or away from its seat.

3. A device for controlling the flow of fluids comprising a housing, two bushings extending within the body of said housing, one of said bushings serving as an inlet for fluid and the other serving as an outlet for fluid, a tubular body within said housing connecting said two bushings, said two bushings and said tubular body forming a continuous passageway and said tubular body being rotatable about its axis and endwise movable; a valve in said tubular body, spaced from the interior wall thereof, and movable therewith; a seat for said valve in said passageway, means engaging the exterior of said tubular body operable from the exterior of said housing for rotating said tubular body, and means for imparting endwise motion to the tubular body upon rotation thereof to move said valve towards or away from its seat.

4. A device for controlling the flow of fluids comprising a housing, two bushings extending within the body of said housing, one of said bushings serving as an inlet for fluid and the other serving as an outlet for fluid, a tubular body within said housing connecting said two bushings, said two bushings and said tubular body forming a continuous passageway, said tubular body and each bushing with which it is connected fitting one within the other in a relationship permitting said tubular body to be rotated about its axis and to be moved endwise; a valve in said tubular body, spaced from the interior wall thereof, and movable therewith; a seat for said valve in said passageway, means engaging the exterior of said tubular body operable from the exterior of said housing for rotating said tubular body, and means for imparting endwise motion to the tubular body upon rotation thereof to move said valve towards or away from its seat.

5. A device for controlling the flow of fluids comprising a housing, tubular inlet means and outlet means extending within the said housing with their innermost ends separated, a tubular body within the housing connecting said tubular inlet and outlet means, said tubular inlet and outlet means and said tubular body forming a continuous passageway and said tubular body being endwise movable without destroying the continuity of said passageway; a valve and seat therefor positioned in said passageway and one of which moves with said tubular body, and means operable from the exterior of said housing for moving said tubular body endwise to vary the distance between said valve and valve seat.

6. A device for controlling the flow of fluids comprising a housing, tubular inlet means and outlet means extending within the said housing with their innermost ends separated, a tubular body within the housing connecting said tubular inlet and outlet means, said tubular inlet and outlet means and said tubular body forming a continuous passageway and said tubular body being endwise movable without destroying the continuity of said passageway; a valve in said tubular body, spaced from the interior wall thereof, and movable therewith; a seat for said valve in said passageway, and means operable from the exterior of said housing for moving said tubular body endwise to move said valve towards or away from its seat.

7. A device for controlling the flow of fluids comprising a housing, tubular inlet means and outlet means extending within the said housing with their innermost ends separated, a tubular body within the housing connecting said tubular inlet and outlet means, said tubular inlet and outlet means and said tubular body forming a continuous passageway and said tubular body being rotatable about its axis and endwise movable; a valve in said tubular body, spaced from the interior wall thereof, and movable therewith; a seat for said valve in said passageway, and means for rotating said tubular body and for imparting endwise motion thereto operable from the exterior of said housing to move said valve towards or away from its seat.

8. A device for controlling the flow of fluids comprising a housing, tubular inlet means and outlet means extending within the said housing with their innermost ends separated, a tubular body within the housing connecting said tubular inlet and outlet means, said tubular inlet and outlet means and said tubular body forming a continuous passageway and said tubular body being rotatable about its axis and endwise movable; a valve in said tubular body, spaced from the interior wall thereof, and movable therewith; a seat for said valve in said passageway, means engaging the exterior of said tubular body operable from the exterior of said housing for rotating said tubular body, and means for imparting endwise motion to the said tubular body upon rotation thereof to move said valve towards or away from its seat.

9. A device for controlling the flow of fluids comprising a housing, tubular inlet means and outlet means extending within the said housing with their innermost ends separated, a tubular body within the housing connecting said tubular inlet and outlet means, said tubular inlet and outlet means and said tubular body forming a continuous passageway, said tubular body and each of said tubular inlet and outlet means with which it is connected fitting one within the other in a relationship permitting said tubular body to be rotated about its axis and to be moved endwise; a valve in said tubular body, spaced from the interior wall thereof, and movable therewith; a seat for said valve in said passageway, means engaging the exterior of said tubular body operable from the exterior of said housing for rotating said tubular body, and means for imparting endwise motion to the tubular body upon rotation thereof to move said valve towards or away from its seat.

10. A device for controlling the flow of fluids comprising a body and conduit means comprising three sections within said body, the central of said three sections being supported by the two end sections and endwise movable without destroying the continuity of said conduit means; a valve within said movable section, spaced from the interior wall thereof, and movable therewith, a seat for said valve on one of said end sections within said conduit means, and means for moving said movable section endwise to move said valve towards or away from its seat.

11. A device for controlling the flow of fluids comprising a body and conduit means comrising three sections within said body, the central of said three sections being supported by the two end sections and rotatable about its axis and endwise movable without destroying the continuity of said conduit means; a valve within said movable section, spaced from the interior wall thereof, and movable therewith, a seat for said valve on one of said end sections within said conduit means, and means for rotating and endwise moving said rotatable section to move said valve towards or away from its seat.

12. A device as defined in claim 2, in which the two bushings, tubular body and valve are of corrosion resisting material.

13. A device as defined in claim 2, in which the two bushings, tubular body and valve are of erosion resisting material.

14. A device as defined in claim 5, in which the tubular inlet and outlet means, the tubular body and the valve are of corrosion resisting material.

15. A device as defined in claim 5, in which the tubular inlet and outlet means, the tubular body and the valve are of erosion resisting material.

16. A device as defined in claim 10 in which the three sections and valve are of corrosion resisting material.

17. A device as defined in claim 10 in which the three sections and valve are of erosion resisting material.

18. A device for controlling the flow of fluids comprising a body and conduit means comprising three sections within said body, the central of said three sections being supported by the two end sections and endwise movable without destroying the continuity of said conduit means; a valve within said movable section, spaced from the interior wall thereof and movable therewith, a seat for said valve on one of said end sections within said conduit means, means for moving said movable section endwise to move said valve towards or away from its seat, the exterior surface of said conduit means being spaced from the interior surface of said body to provide a space for the reception of lubricant and means for introducing lubricant into said space.

AUDLEY D. GASTON.